United States Patent Office 3,073,850
Patented Jan. 15, 1963

3,073,850
METHOD OF PRODUCING α,β-UNSATURATED KETOSTEROIDS CARRYING A METHYL GROUP ON THE β-POSITION CARBON ATOM
Rudolf Wiechert, Berlin-Lichterfelde, Germany, assignor to Schering A.G., Berlin, Germany
No Drawing. Filed Aug. 22, 1961, Ser. No. 133,050
Claims priority, application Germany Aug. 27, 1960
16 Claims. (Cl. 260—397.4)

The present invention relates to a method of producing α,β-unsaturated ketosteroids having a methyl group on the β-position carbon atom, and more particularly to the production of such compounds from a pyrazolino-steroid obtained by diazomethane addition to an α,β-unsaturated ketosteroid.

Methods have been described for the production of α,β-unsaturated ketosteroids which carry a methyl group on the β-position carbon atom from a pyrazolino-steroid obtained by the addition of diazomethane onto the carbon atom double bond of an α,β-unsaturated ketone.

Thus, for example, German Patent No. 1,023,764 describes the splitting off of nitrogen at high temperatures (about 220–250° C.) from $\Delta^{2'}$-pyrazolines derived from 3-keto-$\Delta^1$-steroids, and preferably carrying out this pyrolytic splitting under high vacuum. The reaction proceeds as follows:

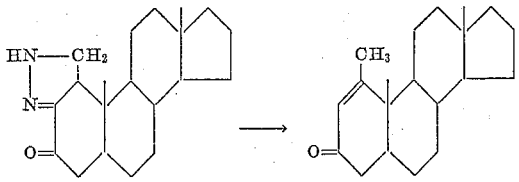

The crude product obtained from this method is oily and contains according to ultraviolet spectroscopic analysis only about 60% of the desired 1-methyl-$\Delta^1$-3-ketosteroid, and the yield of pure compound obtained therefrom corresponds to only about 40% of the theoretical. A further disadvantage of this method is that this low amount of pure yield can only be obtained if the pyrolysis reaction is itself carried out with very pure starting material. Still a further disadvantage is that the thermal decomposition of these pyrazolines requires operational criteria, particularly when carried out under high vacuum, which is very difficult to accomplish technically and renders the entire method difficult to carry out.

Attempts have been been therefore made to replace the thermal splitting of the mentioned pyrazolines by more certain and easier controllable procedures, and for this purpose a method has been described of utilizing acid catalysts, such as perchloric acid, fluoroboric acid or boron trifluoride-etherate, dissolved in an organic solvent. This method is described in the U.S. patent application of Wiechert et al., Serial No. 60,812, filed October 6, 1960, for "Production of 1,2-Methylene and 16,17-Methylene Ketosteroids." However, it was found that by this method the desired nitrogen splitting off can only be carried out at room temperature on the corresponding $\Delta^{1'}$-pyrazoline, and moreover, the desired α,β-unsaturated β-methyl ketosteroids are only obtained as side product and the main product which is obtained is the saturated isomeric α,β-methylene steroid.

Subsequently, in U.S. patent application of Emanuel Kaspar et al., Serial No. 73,495, filed December 5, 1960, for "Production of α,β-Unsaturated Ketosteroids Having a Methyl Group on the β-Position Carbon Atom" a method was described for the catalytic splitting off of nitrogen by carrying out the method instead of in a homogeneous solution by means of an acid catalyst on the surface of an acid adsorption agent which is suspended in an organic solvent in which the pyrazoline is only weakly eluated.

While this method is suitable for technical production of the desired compound, it, however, due to the need of large amounts of adsorption agent which must be treated in a separate step (the ratio of pyrazolino compound to adsorption agent is about 1:50), and because of the large amount of solvent required for eluation after the nitrogen splitting, is not too practical for technical operation from the point of view of time and size of operational plans.

It is accordingly a primary object of the present invention to provide a method of producing α,β-unsaturated ketosteroids having a methyl group on the β-position carbon atom which avoids all of the above enumerated difficulties of the methods previously set forth for the production of such compounds.

It is another object of the present invention to provide a general method of producing α,β-unsaturated ketosteroids having a methyl group on the β-position carbon atom from pyrazolino steroids obtained by diazomethane addition to an α,β-unsaturated ketosteroid, which method results in the production of relatively pure β-methyl ketosteroid in relatively high yield, and which method can be easily carried out on a commercial scale.

Other objects and advantages of the present invention will be apparent from a further reading of the specification and of the appended claims.

With the above and other objects in view, the present invention mainly comprises a method of producing α,β-unsaturated ketosteroids having a methyl group on the β-position carbon atom from a pyrazolino steroid obtained by diazomethane addition to an α,β-unsaturated ketosteroid, which comprises the heating of such pyrazolino ketosteroid at a predetermined pressure at a temperature above 140° C. with at least one organic base which at the predetermined pressure boils at a temperature above about 140° C., this method resulting in the direct splitting of the nitrogen from the pyrazolino steroid and thereby in the direct formation of the corresponding α,β-unsaturated ketosteroid having the methyl group on the β-position carbon atom.

The splitting off of nitrogen in accordance with the present invention is preferably carried out with an organic base such as quinoline, isoquinoline, quinaldine, collidine, lutidine, N,N-dimethylaniline, aniline, or mixtures thereof, possibly in the presence of a dilution agent such as tetralin, at a reaction temperature of above 140° C. In addition to organic bases of the above type which have a boiling point above 140° C., it is possible to carry out the method of the present invention utilizing an organic base having a boiling point below 140° C., for example pyridine, by carrying out the method under pressure so as to be able to reach the necessary reaction temperature of about 140° C.

As will be pointed out in further detail below the method of the present invention is an extremely general method which is applicable to the splitting of nitrogen from all pyrazolino steroids obtained by the diazomethane addition to an α,β-unsaturated ketosteroid. The method of the invention can be carried out using in general any organic base which has a dissociation constant smaller than $10^{-6}$. The most preferred organic bases for the carrying out of the method of the present invention are quinoline and aniline.

As indicated above the method of the present invention is extremely general in application and can be carried out starting with pyrazolino steroids which may be unsubstituted or may be substituted in normal manner. Thus, for example, the starting material can contain free or functionally changed hydroxyl groups or free or functionally changed keto groups or halogen atoms. The hydroxyl groups may, for example, be esterified with aliphatic, alicyclic, arylaliphatic, aromatic or heterocyclic carboxylic acids of 1–11 carbon atoms, such as acetic acid, chloroacetic acid, propionic acid, butyric acid, diethylacetic acid, enanthic acid, capronic acid, undecylenic acid, cyclopentylpropionic acid, succinic acid, phenylacetic acid, furancarboxylic acid, phenoxyacetic acid, caprinic acid, benzoic acid, and the like. Thus, the method of the present invention can be carried out using as starting material a pyrazolino steriod of the formula:

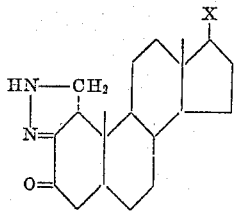

wherein X is selected from the group consisting of alkyl,

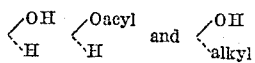

wherein acyl is derived from an organic carboxylic acid of 1–11 carbon atoms.

The method of the present invention may also be carried out using as starting material a pyrazolino steroid of the formula:

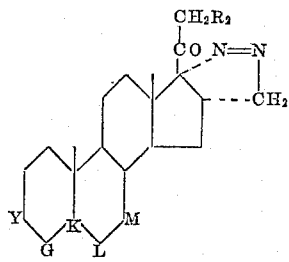

wherein $R_2$ is selected from the group consisting of H, OH and Oacyl wherein acyl is derived from a lower aliphatic carboxylic acid, wherein

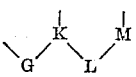

is selected from the group consisting of

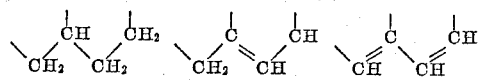

and

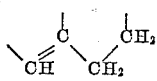

and wherein Y is selected from the group consisting of —CHOH, —CO and —CHOacyl wherein acyl is derived from an organic carboxylic acid of 1–11 carbon atoms.

The 1,2-diazomethylene-3-ketosteroids of the present invention may be designated as such or as [($\Delta^{2'}$-pyrazolino)-4',3':1,2]-3-ketosteroids. Compounds of this type, as well as 16, 17-diazomethylene-20-ketosteroids which may be designated as such or as [($\Delta^{1'}$-pyrazolino)-4',5':16,17α]-20-ketosteroids may be used as starting compounds for the present invention. Among the suitable starting compounds may be mentioned the following:

($\Delta^{1'}$-pyrazolino)-4',5':16,17α - ($\Delta^5$ - pregnene - 3β - ol-20-one-acetate);
($\Delta^{2'}$-pyrazolino)-4',3':1,2α-androstane-17β-ol-3-one;
($\Delta^{2'}$-pyrazolino)-4',3':1,2α-androstane-17β - ol - 3 - one-17-acetate;
($\Delta^{2'}$-pyrazolino)-4',3':1,2α-androstane-17β - ol - 3 - one-17-propionate;
($\Delta^{2'}$-pyrazolino)-4',3':1,2α-androstane-17β-ol-3-one - 17-capronate;
($\Delta^{2'}$-pyrazolino)-4',3':1,2α-androstane-17β - ol - 3 - one-17β-cyclopentylpropionate;
($\Delta^{2'}$-pyrazolino)-4',3':1,2α-androstane-17β - ol - 3 - one-17-enanthate;
($\Delta^{2'}$-pyrazolino)-4',3':1,2α-androstane - 17β - ol - 3 - one-17-caprylate.

The diazomethylene starting compounds of the present invention may be produced by the addition of diazomethylene to the corresponding ketosteroid, as described in German Patent 1,023,764 and in the paper of A. Wettstein, Helv. Chim. Acta, 27, page 1803 (1944). The α,β-unsaturated ketosteroids having a methyl group on the β-position carbon atom produced in accordance with the method of the present invention may be used as intermediates in the production of other steroids, for example by the saturation of double bonds, or, as anabolic agents, as described in the application of Kaspar et al. Serial No. 73,495.

To carry out the spreading of nitrogen in accordance with the present invention the pyrazoline in finely divided condition is introduced into the freshly distilled organic base, the oxygen of the air being preferably replaced by an inert gas, preferably nitrogen, in order to avoid the formation of undesired decomposition products, and the reaction mixture is then heated for about 20 to 90 minutes at the corresponding reaction temperature of above 140° C., preferably at a temperature of about 170–240° C.

If a base is used for the splitting of the nitrogen which has a boiling point of less than 140° C., for example pyridine, the reaction is carried out in a closed pressure vessel with small charges, for example in a bomb tube, preferably at a temperature of about 200° C. after the completion of the reaction the reaction mixture is worked up in normal manner. The precipitated crude product, irrespective of whether the starting material was a melting point separated or only technically pure material, is in the form of crystals and contains, based on ultraviolet spectroscopic examination, about 80% of the desired α,β-unsaturated β-methyl-ketosteroid. After purification of the crude product in normal manner the yield of pure compound corresponds to about 60% of the theoretical.

The following examples are given to further illustrate the present invention. The scope of the invention is not, however, meant to be limited to the specific details of the examples.

*Example 1*

10 g. of ($\Delta^{2'}$-pyrazolino)-4',3':1,2α-androstane-17β-ol-3-one were added to 200 cc. of quinoline. The resulting solution is then heated under nitrogen atmosphere to boiling for 30 minutes. After cooling it is diluted with ether and washed with 4 normal aqueous hydrochloric acid and then with water until neutral. The ethereal solution is dried over sodium sulfate and after filtration from the drying agent the other is drawn off. The thus obtained crude 1-methyl-$\Delta^1$-androstene-17β-ol-3-one (U.V.: $\epsilon_{(242)}$=10,350) is heated on a water bath for 90 minutes with 30 cc. of pyridine and 18 cc. of acetanhydride. The solution is then stirred into ice water, the precipitate is filtered off under suction, dried and recrystallized from isopropyl ether. There is thus obtained 1-methyl-$\Delta^1$-androstene-17β-ol-3-one-17-acetate having a melting point of 140° C. The yield amounts to 60% of the theoretical.

*Example 2*

1 g. of ($\Delta^{2'}$-pyrazolino)-4',3':1,2α-androstane-17β-ol-3-one are heated in 20 cc. of quinoline for 1 hour under nitrogen atmosphere at 170° C. and subsequently worked up as described in Example 1. There is thus obtained 1-methyl-Δ¹-androstene-17β-ol-3-one-17-acetate melting at 140° C.

Example 3

1 g. of (Δ²'-pyrazolino)-4',3':1,2α-androstane-17β-ol-3-one are heated to boiling for 1 hour under nitrogen atmosphere in 20 cc. of aniline. It is then further worked up as described in Example 1 resulting in 1-methyl-Δ¹-androstene-17β-ol-3-one-17-acetate melting at 140° C.

Example 4

1 g. of (Δ²'-pyrazolino)-4',3':1,2α-androstane-17β-ol-3-one are heated for 1 hour to boiling under nitrogen atmosphere in 20 cc. of collidine. It is then further worked up as described in Example 1, resulting in 1-methyl-Δ¹-androstene-17β-ol-3-one-17-acetate melting at 140° C.

Example 5

1 g. of (Δ²'-pyrazolino)-4',3':1,2α-cholestane-3-one in 20 cc. of quinoline are heated under nitrogen for 30 minutes at 220–230° C. After cooling the reaction mixture is diluted with hexane, this solution is washed with 4 normal aqueous hydrochloric acid and then with water until neutral. The hexane solution is dried over sodium sulfate and after filtration of the drying agent the solvent is drawn off. The residue is recrystallized from methanol and there is obtained a 1-methyl-Δ¹cholestene-3-one having a melting point of 77–78° C.

Example 6

1 g. of (Δ²'-pyrazolino)-4',3':1,2α-cholestane-3-one in 20 cc. of lutidine are heated to boiling for 1 hour under nitrogen atmosphere and subsequently further worked up as described in Example 5. The melting point of the thus obtained 1-methyl-Δ¹-cholestene-3-one is 77–78° C.

Example 7

200 mg. of (Δ²'-pyrazolino)-4',3':1,2α-androstane-17β-ol-3-one and 4 cc. of pyridine are heated in a bomb tube for 1 hour at 200° C. The cooled reaction mixture is subsequently taken up in ether, washed three times, each time with two normal hydrochloric acid and then washed with water until neutral. The ethereal solution is dried over sodium sulfate and subsequently, after filtration of the drying agent, the solvent is evaporated under vacuum to dryness. There is thus obtained 114 mg. of a mixture of 1-methyl-Δ¹-androstene-17β-ol-3-one with a small amount of the 1,2α-methylene compound, which exhibits an ultraviolet extinction of $\epsilon_{242}=8530$.

The purification of the crude product proceeds as described in Example 1.

Example 8

100 mg. of (Δ²'-pyrazolino)-4',3':1,2α-androstane-17β-ol-3-one, 0.5 cc. of quinoline and 1.5 cc. of tetralin are heated for 1 hour under nitrogen to boiling. The solution is diluted with ether after cooling and then washed with 2 normal hydrochloric acid and then with water until neutral. The ethereal solution is dried over sodium sulfate and after filtration of the drying agent the solvent is evaporated under vacuum until dryness. The thus obtained crude product is acetylated as described in Example 1. There is thus obtained 1-methyl-Δ¹-androstene-17β-ol-3-one-17-acetate having a melting point of 140° C.

Example 9

3 g. of (Δ¹'-pyrazolino)-4',5'-16,17α-Δ⁵-pregnene-3β-ol-20-one-3-acetate in 60 cc. of quinoline are heated for 30 minutes to 160–170° C. The solution is, after cooling, diluted with ether, washed with 4 normal aqueous hydrochloric acid and then with water until neutral. The ethereal solution is dried over sodium sulfate and after filtration of the drying agent the solvent is evaporated in vacuum until dryness. The residue is recrystallized from ethyl acetate. There is thus obtained 1.9 g. of 16-methyl-Δ⁵,¹⁶-pregnadiene-3β-ol-20-one-3-acetate having a melting point of 171° C., and exhibiting an ultraviolet extinction of $\epsilon_{251}=8750$.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed as new and desired to be secured by Letters Patent is:

1. Method of producing α,β-unsaturated ketosteroids having a methyl group on the β-position carbon atom from a pyrazolino-steroid obtained by diazomethane addition to an α,β-unsaturated ketosteroid, which comprises heating said pyrazolino-steroid at a predetermined pressure at a temperature above about 140° C. with at least one organic base which at said predetermined pressure boils at a temperature above about 140° C. so as to split the nitrogen from said pyrazolino-steroid and thereby form the corresponding α,β-unsaturated ketosteroid having a methyl group on the β-position carbon atom.

2. Method of producing α,β-unsaturated ketosteroids having a methyl group on the β-position carbon atom from a pyrazolino-steroid obtained by diazomethane addition to an α,β-unsaturated ketosteroid, which comprises heating said pyrazolino-steroid at atmospheric pressure at a temperature above about 140° C. with at least one organic base which at said atmospheric pressure boils at a temperature above about 140° C. so as to split the nitrogen from said pyrazolino-steroid and thereby form the corresponding α,β-unsaturated ketosteroid having a methyl group on the β-position carbon atom.

3. Method of producing α,β-unsaturated ketosteroids having a methyl group on the β-position carbon atom from a pyrazolino-steroid obtained by diazomethane addition to an α,β-unsaturated ketosteroid, which comprises heating said pyrazolino-steroid at a predetermined pressure at a temperature of about 170–240° C. with at least one organic base which at said predetermined pressure boils at a temperature above about 170° C. so as to split the nitrogen from said pyrazolino-steroid and thereby form the corresponding α,β-unsaturated ketosteroid having a methyl group on the β-position carbon atom.

4. Method of producing α,β-unsaturated ketosteroids having a methyl group on the β-position carbon atom from a pyrazolino-steroid obtained by diazomethane addition to an α,β-unsaturated ketosteroid, which comprises heating said pyrazolino-steroid at a predetermined pressure at a temperature above about 140° C. with at least one organic base which at said predetermined pressure boils at a temperature above about 140° C. in an atmosphere of a gas inert to the reactants so as to split the nitrogen from said pyrazolino-steroid and thereby form the corresponding α,β-unsaturated ketosteroid having a methyl group on the β-position carbon atom.

5. Method of producing α,β-unsaturated ketosteroids having a methyl group on the β-position carbon atom from a pyrazolino-steroid obtained by diazomethane addition to an α,β-unsaturated ketosteroid, which comprises heating said pyrazolino-steroid at a predetermined pressure at a temperature above about 140° C. with at least one organic base which at said predetermined pressure boils at a temperature above about 140° C. and having a dissociation constant of less than $10^{-6}$ so as to split the nitrogen from said pyrazolino-steroid and thereby form the corresponding α,β-unsaturated ketosteroid having a methyl group on the β-position carbon atom.

6. Method of producing α,β-unsaturated ketosteroids having a methyl group on the β-position carbon atom from a pyrazolino-steroid obtained by diazomethane addition to an α,β-unsaturated ketosteroid, which comprises heating said pyrazolino-steroid at atmospheric pressure at a temperature above about 140° C. with at least one organic base which at said atmospheric pressure boils at a temperature above about 140° C. and having a dissociation constant of less than 10⁻⁶ so as to split the nitrogen from said pyrazolino-steroid and thereby form the corresponding α,β-unsaturated ketosteroid having a methyl group on the β-position carbon atom.

7. Method of producing α,β-unsaturated ketosteroids having a methyl group on the β-position carbon atom from a pyrazolino-steroid obtained by diazomethane addition to an α,β-unsaturated ketosteroid, which comprises heating said pyrazolino-steroid at a predetermined pressure at a temperature above about 140° C. with at least one organic base which at said predetermined pressure boils at a temperature above about 140° C. and being selected from the group consisting of quinoline, isoquinoline, quinaldine, collidine, lutidine, N,N-dimethylaniline, aniline and pyridine so as to split the nitrogen from said pyrazolinosteroid and thereby form the corresponding α,β-unsaturated ketosteroid having a methyl group on the β-position carbon atom.

8. Method of producing α,β-unsaturated ketosteroids having a methyl group on the β-position carbon atom from a pyrazolino-steroid obtained by diazomethane addition to an α,β-unsaturated ketosteroid, which comprises heating said pyrazolino-steroid at atmospheric pressure at a temperature above about 140° C. with quinoline so as to split the nitrogen from said pyrazolino-steroid and thereby form the corresponding α,β-unsaturated ketosteroid having a methyl group on the β-position carbon atom.

9. Method of producing α,β-unsaturated ketosteroids having a methyl group on the β-position carbon atom form a pyrazolino-steroid obtained by diazomethane addiiton to an α,β-unsaturated ketosteroid, which comprises heating said pyrazolino-steroid at atmospheric pressure at a temperature above about 140° C. with aniline so as to split the nitrogen from said pyrazolino-steroid and thereby form the corresponding α,β-unsaturated ketosteroid having a methyl group on the β-position carbon atom.

10. Method of producing α,β-unsaturated ketosteroids having a methyl group on the β-position carbon atom from a pyrazolino-steroid obtained by diazomethane addition to an α,β-unsaturated ketosteroid, which comprises heating said pyrazolino-steroid at superatmospheric pressure at a temperature above about 140° C. with pyridine so as to split the nitrogen from said pyrazolino-steroid and thereby form the corresponding α,β-unsaturated ketosteroid having a methyl group on the β-position carbon atom.

11. Method of producing α,β-unsaturated ketosteroids having a methyl group on the β-position carbon atom from a pyrazolino-steroid obtained by diazomethane addition to an α,β-unsaturated ketosteroid, which comprises heating a pyrazolino-steroid of the formula:

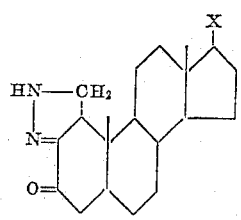

wherein X is selected from the group consisting of alkyl,

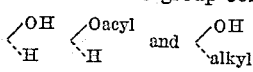

wherein acyl is derived from an organic carboxylic acid of 1–11 carbon atoms at a predetermined pressure at a temperature above about 140° C. with at least one organic base which at said predetermined pressure boils at a temperature above about 140° C. so as to split the nitrogen from said pyrazolinosteroid and thereby form the corresponding α,β-unsaturated ketosteroid having a methyl group on the β-position carbon atom.

12. Method of producing α,β-unsaturated ketosteroids having a methyl group on the β-position carbon atom from a pyrazolino-steroid obtained by diazomethane addition to an α,β-unsaturated ketosteroid, which comprises heating a pyrazolino-steroid of the formula:

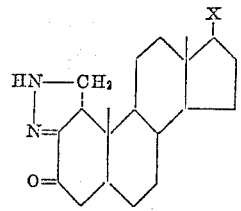

wherein X is selected from the group consisting of alkyl,

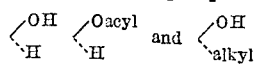

wherein acyl is derived from an organic carboxylic acid of 1–11 carbon atoms at a predetermined pressure at a temperature above about 140° C. with at least one organic base which at said predetermined pressure boils at a temperature above about 140° C. and having a dissociation constant of less than 10⁻⁶ so as to split the nitrogen from said pyrazolino-steroid and thereby form the corresponding α,β-unsaturated ketosteroid having a methyl group on the β-position carbon atom.

13. Method of producing α,β-unsaturated ketosteroids having a methyl group on the β-position carbon atom from a pyrazolino-steroid obtained by diazomethane addition to an α,β-unsaturated ketosteroid, which comprises heating a pyrazolino-steroid of the formula:

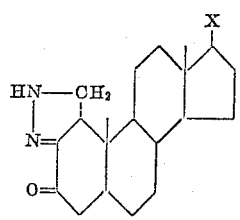

wherein X is selected from the group consisting of alkyl,

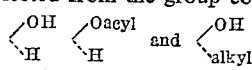

wherein acyl is derived from an organic carboxylic acid of 1–11 carbon atoms at a predetermined pressure at a temperature above about 140° C. with at least one organic base which at said predetermined pressure boils at a temperature above about 140° C. and being selected from the group consisting of quinoline, isoquinoline, quinaldine, collidine, lutidine, N,N-dimethylaniline, aniline and pyridine so as to split the nitrogen from said pyrazolinosteroid and thereby form the corresponding α,β-unsaturated ketosteroid having a methyl group on the β-position carbon atom.

14. Method of producing α,β-unsaturated ketosteroids having a methyl group on the β-position carbon atom from a pyrazolino-steroid obtained by diazomethane addition to an α,β-unsaturated ketosteroid, which comprises heating a pyrazolino-steroid of the formula:

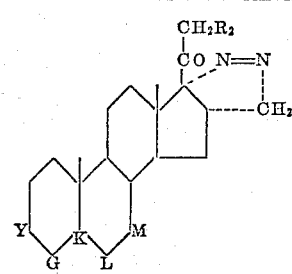

wherein $R_2$ is selected from the group consisting of H, OH and Oacyl wherein acyl is derived from a lower aliphatic carboxylic acid, wherein

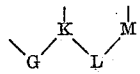

is selected from the group consisting of

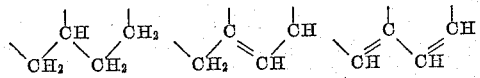

and

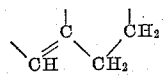

and wherein Y is selected from the group consisting of —CHOH —CO and —CHOacyl wherein acyl is derived from an organic carboxylic acid of 1–11 carbon atoms at a predetermined pressure at a temperature above about 140° C. with at least one organic base which at said predetermined pressure boils at a temperature above about 140° C. so as to split the nitrogen from said pyrazolino-steroid and thereby form the corresponding α,β-unsaturated ketosteroid having a methyl group on the β-position carbon atom.

15. Method of producing α,β-unsaturated ketosteroids having a methyl group on the β-position carbon atom from a pyrazolino-steroid obtained by diazomethane addition to an α,β-unsaturated ketosteroid, which comprises heating a pyrazolino-steroid of the formula:

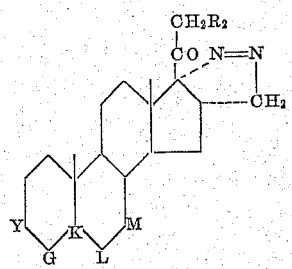

wherein $R_2$ is selected from the group consisting of H, OH and Oacyl wherein acyl is derived from a lower aliphatic carboxylic acid, wherein

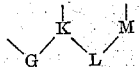

is selected from the group consisting of

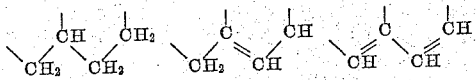

and

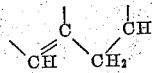

and wherein Y is selected from the group consisting of —CHOH, —CO and —CHOacyl wherein acyl is derived from an organic carboxylic acid of 1–11 carbon atoms at a predetermined pressure at a temperature above about 140° C. with at least one organic base which at said predetermined pressure boils at a temperature above about 140° C. and having a dissociation constant of less than $10^{-6}$ so as to split the nitrogen from said pyrazolino-steroid and thereby form the corresponding α,β-unsaturated ketosteroid having a methyl group on the β-position carbon atoms.

16. Method of producing α,β-unsaturated ketosteroids having a methyl group on the β-position carbon atom from a pyrazolino-steroid obtained by diazomethane addition to an α,β-unsaturated ketosteroid, which comprises heating a pyrazolino-steroid of the formula:

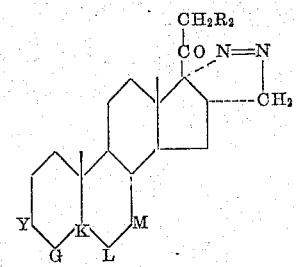

wherein $R_3$ is selected from the group consisting of H, OH and Oacyl wherein acyl is derived from a lower aliphatic carboxylic acid, wherein

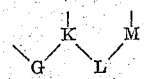

is selected from the group consisting of

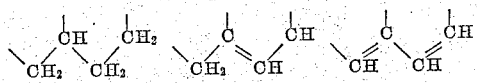

and

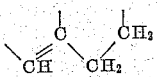

and wherein Y is selected from the group consisting of —CHOH, —CO and —CHOacyl wherein acyl is derived from an organic carboxylic acid of 1–11 carbon atoms at a predetermined pressure at a temperature above about 140° C. with at least one organic base which at said predetermined pressure boils at a temperature above about 140° C. and being selected from the group consisting of quinoline, isoquinoline, quinaldine, collidine, lutidine, N,N-dimethylaniline, aniline and pyridine so as to split the nitrogen from said pyrazolinosteroid and thereby form the corresponding α,β-unsaturated ketosteroid having a methyl group on the β-position carbon atom.

No references cited.